March 27, 1934. W. A. GRUENBERG 1,952,708
WHEEL FOR TOY VEHICLES
Filed May 20, 1933
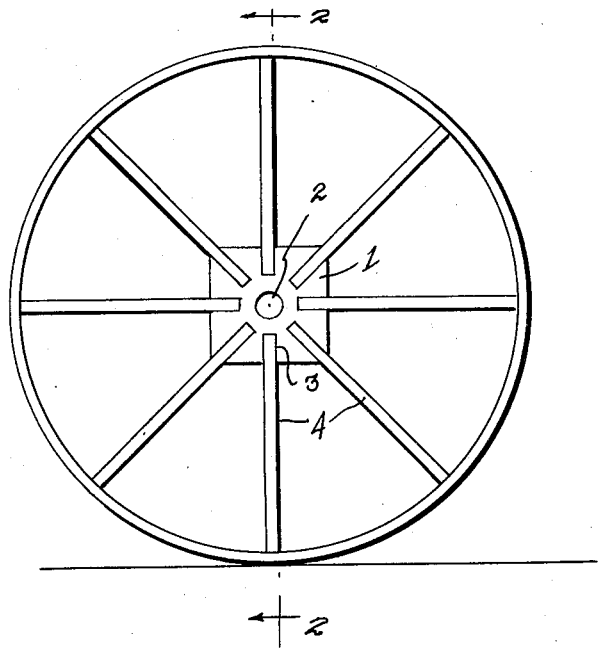
Fig. 1
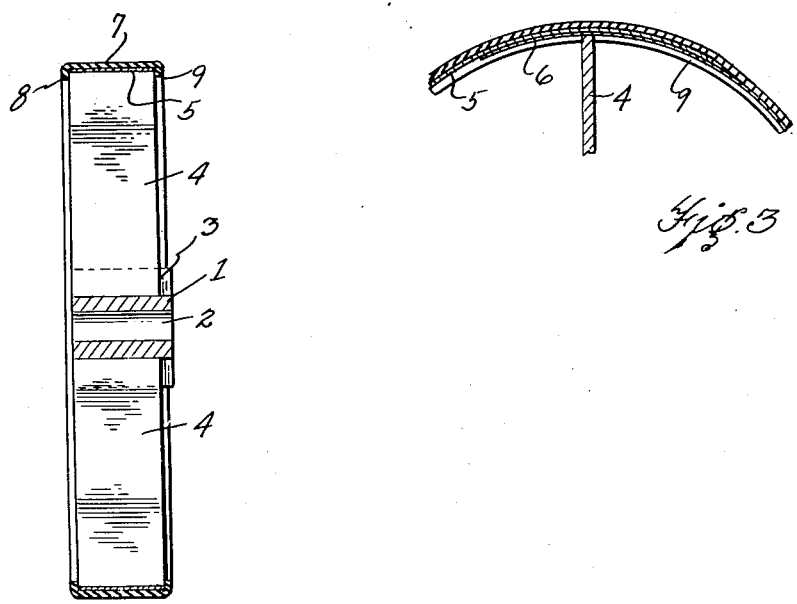
Fig. 2
Fig. 3
INVENTOR.
WALTER A. GRUENBERG
BY
ATTORNEY.

Patented Mar. 27, 1934

1,952,708

UNITED STATES PATENT OFFICE 1,952,708

WHEEL FOR TOY VEHICLES

Walter A. Gruenberg, Royal Oak, Mich., assignor to Bilz-Em Toys, Inc., Detroit, Mich., a corporation of Michigan Application May 20, 1933, Serial No. 671,956

7 Claims. (Cl. 46—48)

This invention relates to wheels for toy vehicles, the object being to provide an inexpensive construction and unique arrangement of parts providing a structure in which the parts may be readily assembled or disassembled.

Another object of the invention is to provide a rubber tired toy wheel structure in which the tire is formed of a rubber band of a width greater than the tread of the wheel to thereby provide flanges for preventing the wheel rim from displacement relative to the spokes.

These and other objects and novel features of the invention are hereinafter more fully described and claimed, and the preferred construction of a toy wheel embodying my invention is shown in the accompanying drawing in which—

Fig. 1 is a side elevation of a wheel embodying my invention.

Fig. 2 is a section taken on line 2—2 of Fig. 1.

Fig. 3 is an enlarged detail in section showing the wheel rim structure.

The wheel consists of a hub 1 formed of a block of wood or other desirable material having a longitudinal aperture 2 for a shaft or axle and further has a series of radial slots, parallel with the axis of the aperture 2 for the axle or shaft, in which the inner ends of the spokes 4 are inserted and in which they fairly tightly but removably fit.

The spokes 4 are in the nature of the slabs of comparatively thin wood and are preferably less in width than the hub as will be understood from Fig. 2 although they may be of the same width if desired. It will be evident without further description that the positioning of the spokes in their desired relationship in the slots is of the simplest nature within the capacity of any child of a few years old to perform and in order that the round wheel may be provided these spoke elements 4, which are all of the same length, I provide a rim consisting of a flexible strip 5 of wood veneer or other convenient material and the ends overlapped as shown at 6 in Fig. 3. A rubber band 7, which is of greater width than the strip 5 and spokes 4, is then placed over the outer face of the strip and, due to its being of greater width, side flanges 8 and 9 are provided which extend over the side edges of the strip 5 sufficiently far to also overlie the side edges of the outer ends of the spoke members 4. The stretching of the rubber band 7 over the inner flexible strip 5 causes these side flanges 8 and 9 to take substantially the position shown in Fig. 2 and these flanges sustain the unattached member 5 in place on the spoke ends. The rubber band is less in normal diameter than the diameter of the rim and therefore when in position applies pressure to the spoke ends to hold them in place in a hub. Thus the parts are all easily disassembled by removing the rubber band thus freeing the strip 5 for removal and permitting the spokes 4 likewise to be removed from the hub or block 1 making the hub block and slabs 4 available in making other structures in association with other similar building blocks forming therewith a complete set for constructing various structures.

The principal feature of the invention therefore resides in these unattached but removably assembled blocks, slabs and strips to form a wheel which has the desired rubber tire and it is further evident that the various objects of the invention are attained by the construction described.

Having thus briefly described my invention, its utility and mode of operation, what I claim and desire to secure by Letters Patent of the United States is—

1. A toy vehicle wheel comprising a block having a central aperture and radial slots parallel with the aperture opening through the surface and both ends of the block, a series of spokes each consisting of a slab of suitable material insertible in the slots with the outer ends of the spoke at the same radial distance from the aperture, a rim consisting of a strip of flexible material encircling but unattached to the spoke ends, and means for removably supporting the rim in place on said spoke ends.

2. A toy vehicle wheel comprising a block rectangular in cross section having a central aperture and a series of radially positioned slots parallel with the aperture and opening through the face of the block, a series of thin strips of suitable material of a width not greater than the length of the block insertible in the said slots, the strips being of equal length and so arranged that the terminal ends thereof are positioned at the same radial distance from the center of the block, and a contractible rim detachably secured about the spoke ends.

3. A toy vehicle wheel comprising a block having a central aperture and radial slots parallel thereto and opening through the surface of the block, a series of spokes, consisting of comparatively thin strips of a width approximating the length of the block and insertible in the slots, the outer ends of the spoke being positioned at the same radial distance from the center of the aperture, a rim formed of a strip of flexible material of a width approximately equal to the width of the spokes and wrapped about the outer ends of the spokes, and a tire member consisting of a rubber band having a width greater than the width of the rim and, when stretched thereover, providing side flanges engaging the edges of the spokes to thereby prevent material displacement of the rim and spokes and apply pressure to maintain the parts in assembled relation.

4. A toy vehicle wheel comprising a hub and detachably assembled spoke elements, a rim consisting of a flexible strip of material wrapped about the spoke ends with the ends of the rim in overlapping relation, and a rubber band placed under tension by positioning the same over the exterior face of the rim to thereby maintain the rim, spokes and hub in assembled relation under pressure.

5. A toy vehicle wheel comprising a hub and detachably assembled spoke elements, a rim consisting of a flexible strip of material wrapped about the spoke ends with the ends of the rim in overlapping relation, and a rubber band placed under tension by positioning the same over the exterior of the rim to thereby maintain the rim, spokes and hub in assembled relation under pressure, the said band having a width greater than the width of the rim to thereby provide side flanges overlying the rim and adjacent spoke ends.

6. A toy vehicle wheel comprising a hub and detachably assembled spoke elements, a rim positioned about the outer ends of the spoke elements, the width of the rim and spoke elements being approximately the same, a rubber band of greater width than the rim adapted to be positioned thereover under tension to hold the hub, spokes and rim in assembled relation, the portions of the band at the edges overlying the edge of the rim and outer ends of the spoke elements to prevent lateral displacement of the rim and spokes.

7. A toy vehicle wheel comprising a hub, spoke elements detachably assembled therewith, a circumferentially contractible rim element positioned about the outer ends of the spoke element, and a rubber band placed under tension when positioned on the rim whereby the tendency of the band to contract causes a contraction of the rim and consequent placing of pressure radially upon the spokes to maintain the several parts in assembled relation.

WALTER A. GRUENBERG.